E. F. NORELIUS.
GROUSER FOR ENDLESS CHAIN TRACKS.
APPLICATION FILED NOV. 18, 1916.
1,304,357.  Patented May 20, 1919.
2 SHEETS—SHEET 1.
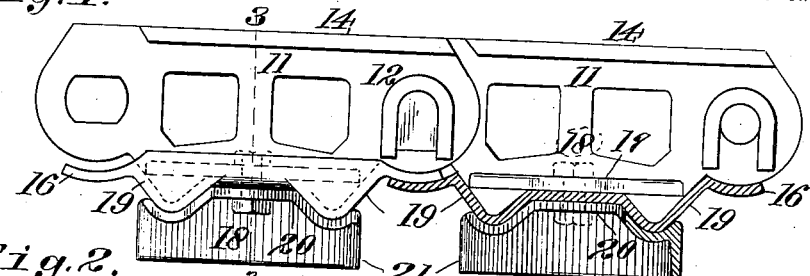
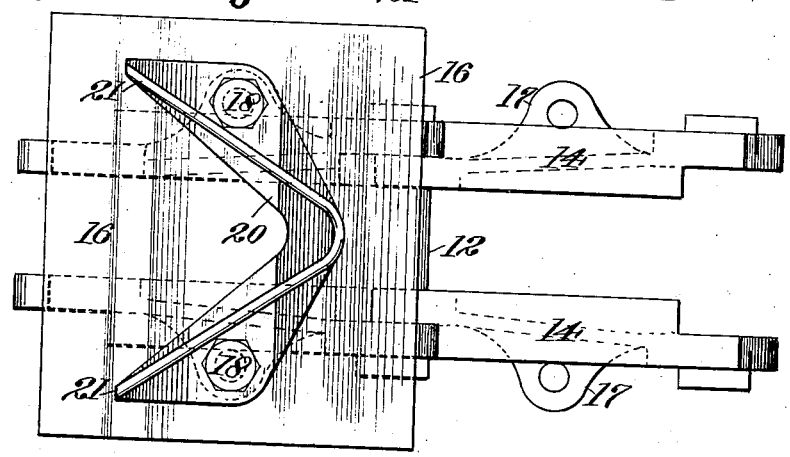
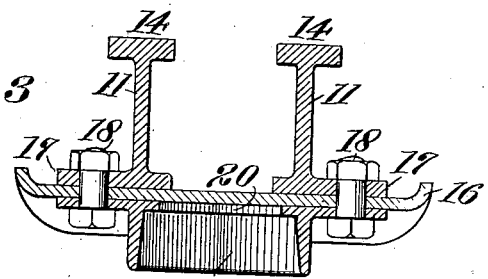
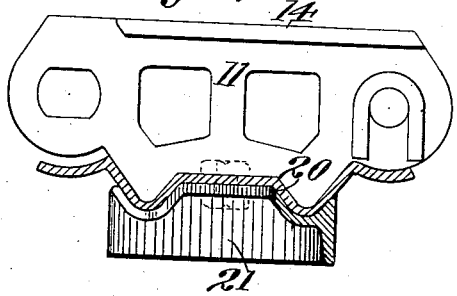
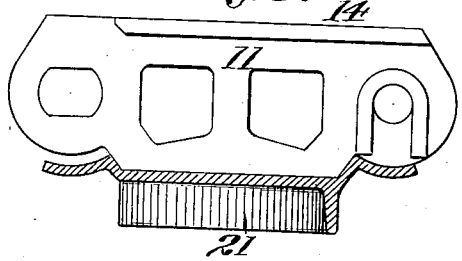
WITNESSES:
Charles Rickles
Thos Castberg
INVENTOR
Emil F. Norelius.
BY Strong & Townsend.
ATTORNEYS

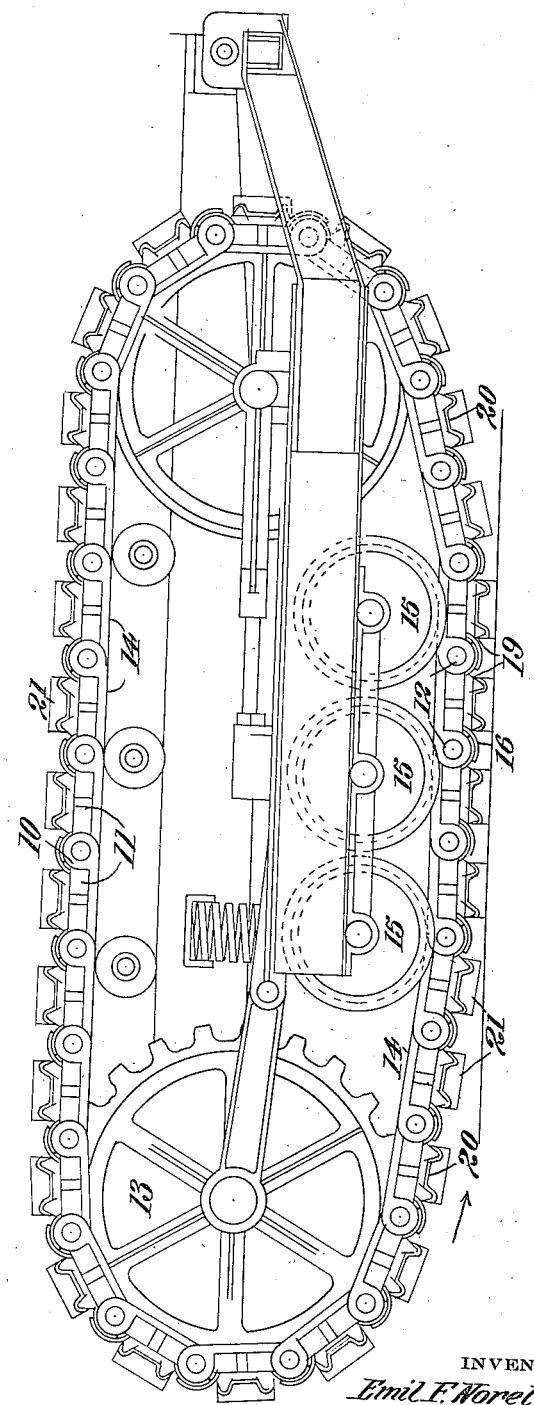

UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

GROUSER FOR ENDLESS-CHAIN TRACKS.

1,304,357.  Specification of Letters Patent.  Patented May 20, 1919.

Application filed November 18, 1916. Serial No. 132,056.

*To all whom it may concern:*

Be it known that I, EMIL F. NORELIUS, a citizen of the United States, residing at Peoria, county of Peoria, and State of Illinois, have invented new and useful Improvement in Grousers for Endless-Chain Tracks, of which the following is a specification.

This invention relates to endless chain tracks for roller truck mechanism, and has for its object to provide a simplified and durable grouser therefor, which will afford improved biting or ground engaging action, and have the facility of cleaning itself of mud and debris.

The links of self-laying tracks carry shoes generally corrugated or provided with transverse ribs for engagement with the ground, but these are insufficient for special conditions such as marshy land or extremely soft ground, since they do not enter deeply enough into the ground, and furthermore tend to collect and retain the mud and debris.

For such special conditions I have devised the present grouser which is capable of entering the ground deeply enough to afford sufficient traction even in soft earth or mud, and has the facility of freeing itself from all mud and trash.

A preferred and modified form of my invention is exemplified in the following description and illustrated in the accompanying drawings, in which:—

Figure 1 shows a side elevation partly in section and a portion of a chain track embodying my invention.

Fig. 2 shows an inverted plan view of the same.

Fig. 3 shows a sectional view taken on the line 3—3 of Fig. 1.

Fig. 4 shows a central longitudinal vertical sectional view of a link and shoe equipped with my improved form of grouser.

Fig. 5 shows a similar view of a link equipped with my grouser, the shoe having been omitted.

Fig. 6 shows a side elevation of a well known form of roller truck mechanism carrying an endless chain truck equipped with my grouser.

A roller truck mechanism of well known construction is shown in Fig. 6 and carries an endless chain track 10 made up of a series of articulated links which comprise the parallel side plates 11 and gudgeon pins 12 for connecting adjacent links together and for engagement with the teeth of a driving sprocket wheel 13, said side plates 11 being flanged at their inner side faces and forming a track 14 to support the rollers 15 of the truck mechanism. Each link carries at its perimeter a shoe 16 detachably secured to outer flanges 17 on the side plates by centrally positioned bolts 18. Transverse ribs or corrugations 19 are generally formed on each shoe and normally constitute ground engaging members.

Where the ground is extremely soft a deep and pointed lug is desirable in order to prevent slippage of the truck and the present grouser is designed for this purpose. Preferably it comprises a flat anchoring plate 20 carrying a deep and narrow protruding flange 21 on its outer face, V shaped in plan. There is one grouser for each link and it may be put in place over the usual shoe 16 as best shown in Figs. 3 and 4 in which case the anchoring plate 20 is made V shape in plan and has openings intermediate the ends of each leg to receive the bolts 18 which also secure the shoe 16 in place. This anchoring plate should conform to the contour of the shoe 16, being curved to fit the corrugations or ribs 19 thereon. As shown in Fig. 5, the usual shoe 16 may be omitted and the anchoring plate 20 of the grouser will take the place of said shoe, being made somewhat rectangular in form and of large area to support the link.

With the link on the ground the apex of the flange 21 is disposed rearwardly and the median line of the flange, or line bisecting the angle, will coincide with the fore and aft central line of the link. The legs of the flange will thus be evenly and centrally disposed beneath the link, and a considerable supporting area is thereby afforded.

The length of the longitudinal support for the link will be represented by the altitude of the V shaped flange, and the length of the transverse support for the link will be equivalent to the base of the flange, and thereby the link is prevented from rocking either on a longitudinal or transverse axis when the grouser is on the ground.

It will be noted that the angle of the V shaped flange is slightly less than a right angle, which affords a longer support longitudinally of the link than if the angle were made greater, although this is a factor to be governed to some extent by the shape and size of the link. This grouser is self-cleaning inasmuch as the legs of the flanges are inclined in the right direction to free themselves from mud and trash when the links are rising from the ground at the rear of the track and nothing is present at the base or rear of the V shaped flange, to obstruct the falling off of the mud. Whereas in Figs. 3 and 4, the grouser is fitted over a corrugated or ribbed shoe and is shaped to conform thereto, such ribs will serve to relieve the bolts 18 from much of the shearing strains. This grouser may be made of cast steel at very small cost, the preferred form thereof being that shown in Figs. 1–4 inclusive, in which the anchor plate requires but very little material.

Another advantage of this grouser peculiar to endless chain tracks is that it tends to equalize the strains on the links as they come into engagement with the ground at the front end of the track. The articulated links strike the ground end first and a considerable load is thrown upon the end thereof. With the V shaped grouser, the apex of which is pointed rearwardly, the first contact with the ground is made by the point of the flange which will sink readily into the ground and allow the major portion of the shoe to come instantly into contact with the ground whereby to support the link over a greater area.

Various changes in the construction and arrangements of the several parts herein shown and described may be employed without departing from the spirit of my invention as disclosed in the appended claims.

Having thus described my invention, what I claim and desire to secure by Letters Patent is:—

1. In a self-laying track tractor, the combination with an endless chain track having articulated link sections, of deep ground-engaging means on each link to resist lateral and longitudinal movement of the chain track relatively to the surface traveled on while permitting automatic discharge of accumulated dirt and preventing jarring and teetering of the links, said means comprising flanges extending diagonally across each link, forming an acute angle with each other, the apex of the said angle being rearwardly disposed when on the ground.

2. In a self-laying track tractor, the combination with an endless chain track having articulated link sections, of deep ground-engaging means on each link to resist lateral and longitudinal movement of the chain track relatively to the surface traveled on while permitting automatic discharge of accumulated dirt and preventing jarring and teetering of the links, said means comprising an anchor plate and an outwardly projecting narrow flange on the plate V shape in plan and arranged to have its apex disposed rearwardly when on the ground.

3. In a self-laying track tractor, the combination with an endless chain track having articulated link sections, of deep ground-engaging means on each link to resist lateral and longitudinal movement of the chain track relatively to the surface traveled on while permitting automatic discharge of accumulated dirt and preventing jarring and teetering of the links, said means comprising an anchor plate bolted to the link and provided with an integral flange angular in plan, said plate being disposed centrally of the link for engagement with the ground.

4. In a self-laying track tractor, the combination with an endless chain track having articulated link sections, of deep ground-engaging means on each link to resist lateral and longitudinal movement of the chain track relatively to the surface traveled on while permitting automatic discharge of accumulated dirt and preventing jarring and teetering of the links, said means comprising a grouser detachably secured to each link and comprising an anchoring plate having an outwardly protruding narrow flange thereon, V shape in plan, arranged centrally thereon with its apex disposed rearwardly when the link is on the ground, the angle of said flange being less than a right angle.

5. In a self-laying track tractor, the combination with an endless chain track having articulated link sections, of deep ground-engaging means on each link to resist lateral and longitudinal movement of the chain track relatively to the surface traveled on while permitting automatic discharge of accumulated dirt and preventing jarring and teetering of the links, said means comprising a shoe bolted to each link and provided with transversely extending ribs, and a grouser on each shoe secured in place by the same bolts and comprising an anchor plate conforming to the contour of a shoe and carrying an outwardly protruding narrow flange, V shape in plan.

6. In a self-laying track tractor, the combination with an endless chain track having articulated link sections, of deep ground-engaging means on each link to resist lateral and longitudinal movement of the chain track relatively to the surface traveled on while permitting automatic discharge of accumulated dirt and preventing jarring and teetering of the links, said means comprising a shoe carried by each link, centrally positioned bolts for securing said shoe in place on the links, transversely extending ribs on either side of the center of the shoe, and a grouser for each shoe comprising a V shaped anchor plate secured in place by said centrally positioned bolts, and a projecting flange on the plate also V shape in plan, positioned with its median line coincident with the fore and aft center line of the link and having its apex disposed rearwardly when on the ground.

7. In a self-laying track tractor, the combination with an endless chain track having articulated link sections, of deep ground-engaging means on each link to resist lateral and longitudinal movement of the chain track relatively to the surface traveled on while permitting automatic discharge of accumulated dirt and preventing jarring and teetering of the links, said means comprising an anchor plate V shape in plan and formed with transversely extending depressions near the apex and base thereof, and provided with an opening intermediate the ends of each leg whereby to receive fastening means and an outwardly protruding narrow flange formed on the plate and also made V shape in plan.

In testimony whereof I have hereunto set my hand.

EMIL F. NORELIUS.